(12) United States Patent
Singh et al.

(10) Patent No.: US 12,718,163 B2
(45) Date of Patent: Aug. 25, 2026

(54) METHOD AND SYSTEM FOR EMBEDDING CONTEXTUAL VIDEO CONTENT FOR WORKFLOW OPTIMIZATION

(71) Applicant: HONEYWELL INTERNATIONAL INC., Charlotte, NC (US)

(72) Inventors: Ankit Singh, Apex, NC (US); Judith Fainor, Doylestown, PA (US); Abhishek Hiremath, Houston, TX (US); Amy Spizzirri, Irving, TX (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 78 days.

(21) Appl. No.: 18/638,743

(22) Filed: Apr. 18, 2024

(65) Prior Publication Data

US 2025/0328839 A1 Oct. 23, 2025

(51) Int. Cl.
*G06Q 10/00* (2026.01)
*G06Q 10/0631* (2023.01)
*G06Q 10/0633* (2023.01)

(52) U.S. Cl.
CPC ... *G06Q 10/0633* (2013.01); *G06Q 10/06316* (2013.01)

(58) Field of Classification Search
CPC ...................................................... G06Q 10/00
(Continued)

(56) References Cited

U.S. PATENT DOCUMENTS 11,679,328 B2 6/2023 Wiggeshoff
2005/0192831 A1 * 9/2005 Ellison ............. G06Q 10/06398 705/345

(Continued)

FOREIGN PATENT DOCUMENTS

CN 111193939 A 6/2021

OTHER PUBLICATIONS

Zesium, Best Ways to Track User Behavior in Mobile App, 11 pages. https://www.hotjar.com/website-tracking/how-to-track-user-activity/.

(Continued)

*Primary Examiner* — Mustafa Iqbal
(74) *Attorney, Agent, or Firm* — Alston & Bird LLP

(57) ABSTRACT

The present disclosure provides a method and system for embedding contextual video content for optimizing a user's workflow on a task. The method comprises selecting at least one task to be performed by one or more users and identifying the profile of the one or more users based on the selected task. The one or more current actions of the user on the workflow are assessed to obtain real time correlations between the one or more current actions and historical workflow metrics of the user, wherein the historical workflow metrics comprises one or more previous actions or preferences of the user for executing the workflow of the at least one selected task. The method further comprises determining that the one or more users requires contextual assistance to execute the workflow of the at least one selected task when the one or more current actions of the user reaches a pre-defined threshold. Upon the user action reaching a pre-defined threshold, retrieving and transmitting a contextual video content from a video repository to the one or more users, wherein the contextual video content is a recommended next action of the user, and wherein the recommended next action of the user is an intended action of the user for completing the workflow of the at least one selected task. The one or more actions of the user on the recommended contextual video content are assessed to update the video repository with the optimized workflow. A system for embedding contextual video content for optimizing a user's workflow on a task is also disclosed.

20 Claims, 6 Drawing Sheets

(58) Field of Classification Search
USPC .......................................................... 705/7.27
See application file for complete search history.

(56) References Cited

U.S. PATENT DOCUMENTS

| | | | | |
|---|---|---|---|---|
| 2007/0073565 | A1* | 3/2007 | D'Heedene | G06Q 10/00 705/7.22 |
| 2008/0103876 | A1* | 5/2008 | Armstrong | G06Q 30/0202 705/7.31 |
| 2013/0297342 | A1* | 11/2013 | Duplay | G16H 50/70 705/3 |
| 2015/0371172 | A1* | 12/2015 | Minter | G06Q 10/06398 705/7.42 |
| 2022/0292999 | A1* | 9/2022 | Kratzer | G06N 20/00 |
| 2022/0327459 | A1* | 10/2022 | Quinones | G06Q 10/0637 |

OTHER PUBLICATIONS

Hotjar, How to track user activity on your website, 28 pages. https://www.hotjar.com/website-tracking/how-to-track-user-activity/.

* cited by examiner

METHOD AND SYSTEM FOR EMBEDDING CONTEXTUAL VIDEO CONTENT FOR WORKFLOW OPTIMIZATION

TECHNICAL FIELD

Embodiments of the present disclosure generally relate to workflow management of enterprises or organizations. Particularly, the present disclosure relates to a method and system for optimizing workflows associated with operations of a business enterprise.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also correspond to implementations of the claimed technology.

Business enterprises or organizations typically handle large amounts of data and information for planning and managing their business operations. Each enterprise may implement various business processes to manage their day-to-day operations and to achieve certain business goals or outcomes. Such business processes may typically involve a series of workflows to complete a particular business process or task. Each workflow may be a sequence of steps or actions that happen between the beginning and end of any task and carried out in a specific order by users of the enterprise to complete the task. For example, a large enterprise may have thousands of users (e.g. employees) who may perform various tasks related to business operations. Tasks in a manufacturing unit of an enterprise may, for example include but not limited to annual product quality review, quality management review, recalling of faulty products, quality control issues, supply chain problems, regulatory compliance, etc. The workflows may define how work moves through an organization across various departments or from one employee to another employee or from one team member to another team member. The complexity of the workflows for completing one or more tasks may vary based upon the type of industry, size of the enterprise, and/or products or services that the industry caters to. Examples of industries may include but not limited to Pharma, Life Sciences, Bio Tech, Medical Devices industry.

As businesses evolve, the volume of data and information that needs to be handled increases manifold so does the complexity of the workflows associated with the execution of tasks. For example, for large business enterprises, the data that is manipulated is voluminous and there is also a rapid rate of change of data. Therefore, workflows for different tasks or business processes of the enterprises need to be managed effectively so that the tasks are executed without bottlenecks, delays and errors and to provide an optimized workflow.

Workflow management thus becomes an important and integral process for streamlining the day-to-day business operations. Having well-defined workflows help in organizing the tasks and in prioritizing the steps involved in executing the workflows. Team members and decision-makers of the organization can monitor the workflows and execution of various tasks in order to standardize the business processes and establish a robust framework. Improved and optimized workflows also help to create an intuitive UI, thereby enhancing user experience.

Accordingly, there is a need for technical solutions to address the technical problems discussed above, and other inefficiencies of the prior arts. Particularly, there is a need to intelligently assess user actions and workflow metrics of users and suggest optimal solutions to the users for any business process. More particularly, there is a need to intelligently assess user actions from existing workflow metrics and recommend potential future actions to the users for workflow optimization.

The legacy approaches fail to provide efficient techniques for managing workflows of tasks in relation to business operations of the enterprise, that not only enhances the operational efficiency of the business process but also provides insights for business intelligence.

Applicant has identified many technical challenges and difficulties associated with current solutions and through applied effort, ingenuity, and innovation, the applicant has provided a solution to the above-mentioned drawbacks.

SUMMARY OF THE INVENTION

In general, embodiments of the present disclosure relate to workflow management of enterprises or organizations. Other implementations will be, or will become, apparent to one with skill in the art upon examination of the following figures and detailed description. It is intended that all such additional implementations be included within this description be within the scope of the disclosure and be protected within the scope of the following claims.

In one embodiment, the present disclosure provides a method for embedding contextual video content for optimizing a user's workflow on a task. The method comprises selecting at least one task to be performed by one or more users, identifying the profile of the one or more users based on the selected task. The method further comprises assessing one or more current actions of the user on the workflow to obtain real time correlations between the one or more current actions and historical workflow metrics of the user, wherein the historical workflow metrics comprises one or more previous actions or preferences of the user for executing the workflow of the at least one selected task. The method further comprises determining that the one or more users requires contextual assistance to execute the workflow of the at least one selected task when the one or more current actions of the user reaches a pre-defined threshold. The method further comprises, retrieving and transmitting a contextual video content from a video repository to the one or more users, wherein the contextual video content is a recommended next action of the user, and wherein the recommended next action of the user is an intended action of the user for completing the workflow of the at least one selected task. The method further comprises assessing the one or more actions of the user on the recommended contextual video content to update the video repository with the optimized workflow.

In another embodiment, the present disclosure provides a system for embedding contextual video content for optimizing a user's workflow on a task. The system comprises, a processor, a memory storing program instructions which, when executed by the processor, causes the processor to select at least one task to be performed by one or more users and identify the profile of the one or more users based on the selected task. The system is further configured to assess one or more current actions of the user on the workflow to obtain real time correlations between the one or more current actions and historical workflow metrics of the user, wherein the historical workflow metrics comprises one or more previous actions or preferences of the user for executing the workflow of the at least one selected task. The system is further configured to determine that the one or more users requires contextual assistance to execute the workflow of the at least one selected task when the one or more current actions of the user reaches a pre-defined threshold. The system is further configured to retrieve and transmit a contextual video content from a video repository to the one or more users, wherein the contextual video content is a recommended next action of the user, and wherein the recommended next action of the user is an intended action of the user for completing the workflow of the at least one selected task. The system is further configured to assess the one or more actions of the user on the recommended contextual video content to update the video repository with the optimized workflow.

In yet another embodiment, the present disclosure provides a computer program product comprising at least one non-transitory computer-readable storage medium having computer-readable program code portions stored therein executed by a processor, the computer-readable medium when executed, is configured to select at least one task to be performed by one or more users, identify the profile of the one or more users based on the selected task. The program executed by the processor is further configured to dynamically assess one or more current actions of the user on the workflow to obtain real time correlations between the one or more current actions and historical workflow metrics of the user, wherein the historical workflow metrics comprises one or more previous actions or preferences of the user for executing the workflow of the at least one selected task. The program executed by the processor is further configured to determine that the one or more users requires contextual assistance to execute the workflow of the at least one selected task when the one or more current actions of the user reaches a pre-defined threshold. The program executed by the processor is further configured to retrieve and transmit a contextual video content from a video repository to the one or more users, wherein the contextual video content is a recommended next action of the user, and wherein the recommended next action of the user is an intended action of the user for completing the workflow of the at least one selected task. The program executed by the processor is further configured to assess the one or more actions of the user on the recommended contextual video content to update the video repository with the optimized workflow.

The above summary is provided merely for the purpose of summarizing some example embodiments to provide a basic understanding of some aspects of the present disclosure. Accordingly, it will be appreciated that the above-described embodiments are merely examples and should not be construed to narrow the scope or spirit of the present disclosure in any way. It will be appreciated that the scope of the present disclosure encompasses many potential embodiments in addition to those here summarized, some of which will be further described below. Other features, aspects, and advantages of the subject will become apparent from the description, the drawings, and the claims.

BRIEF DESCRIPTION OF THE DRAWINGS

Figure 1:
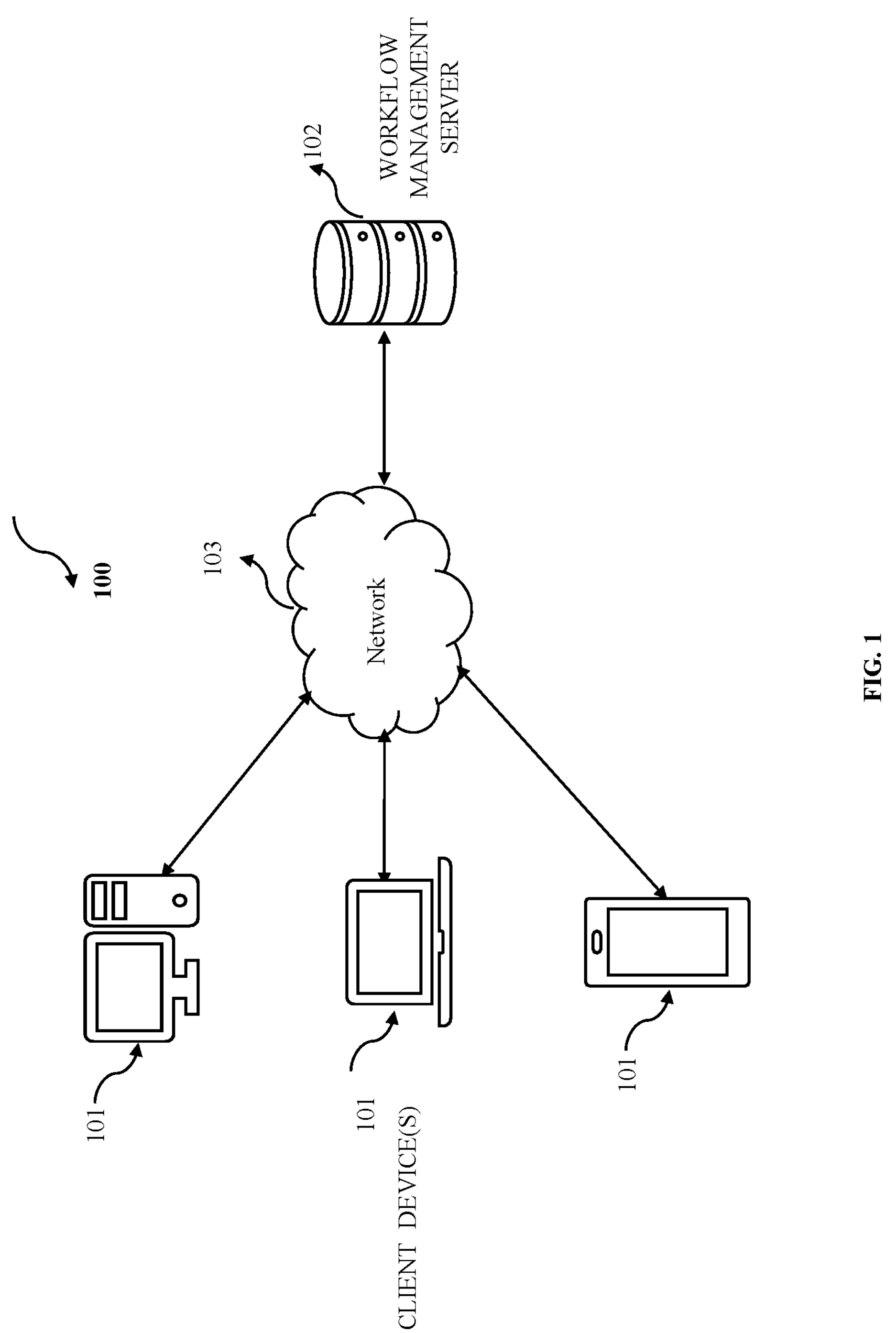
Figure 2:
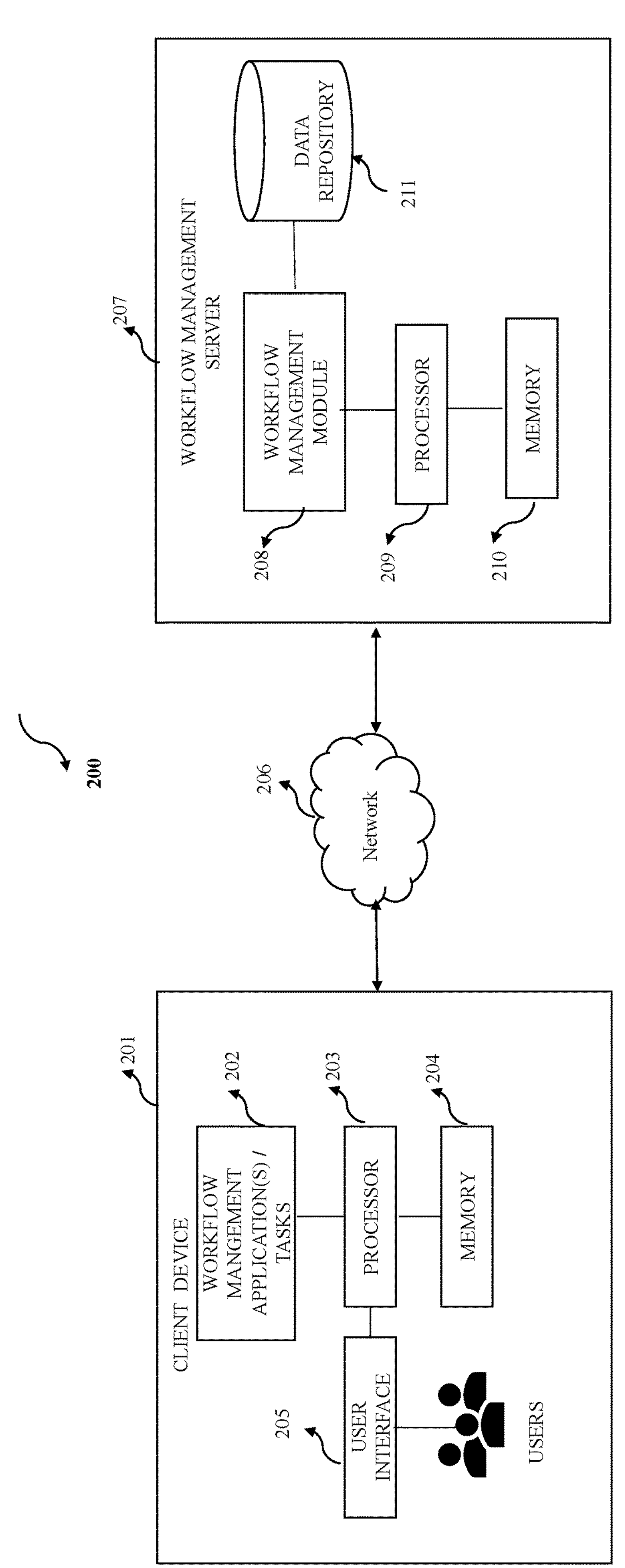
Figure 3:
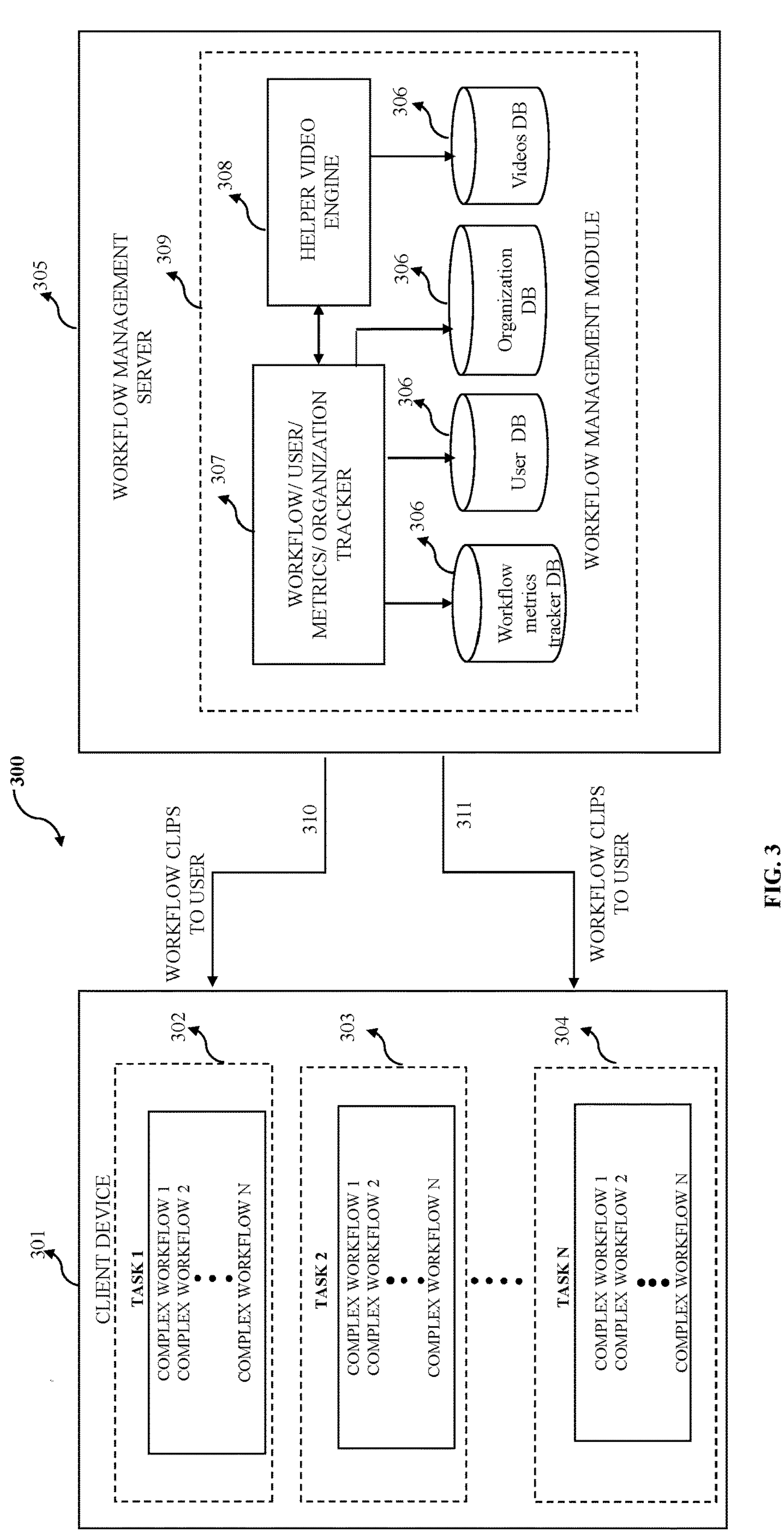
Figure 4:
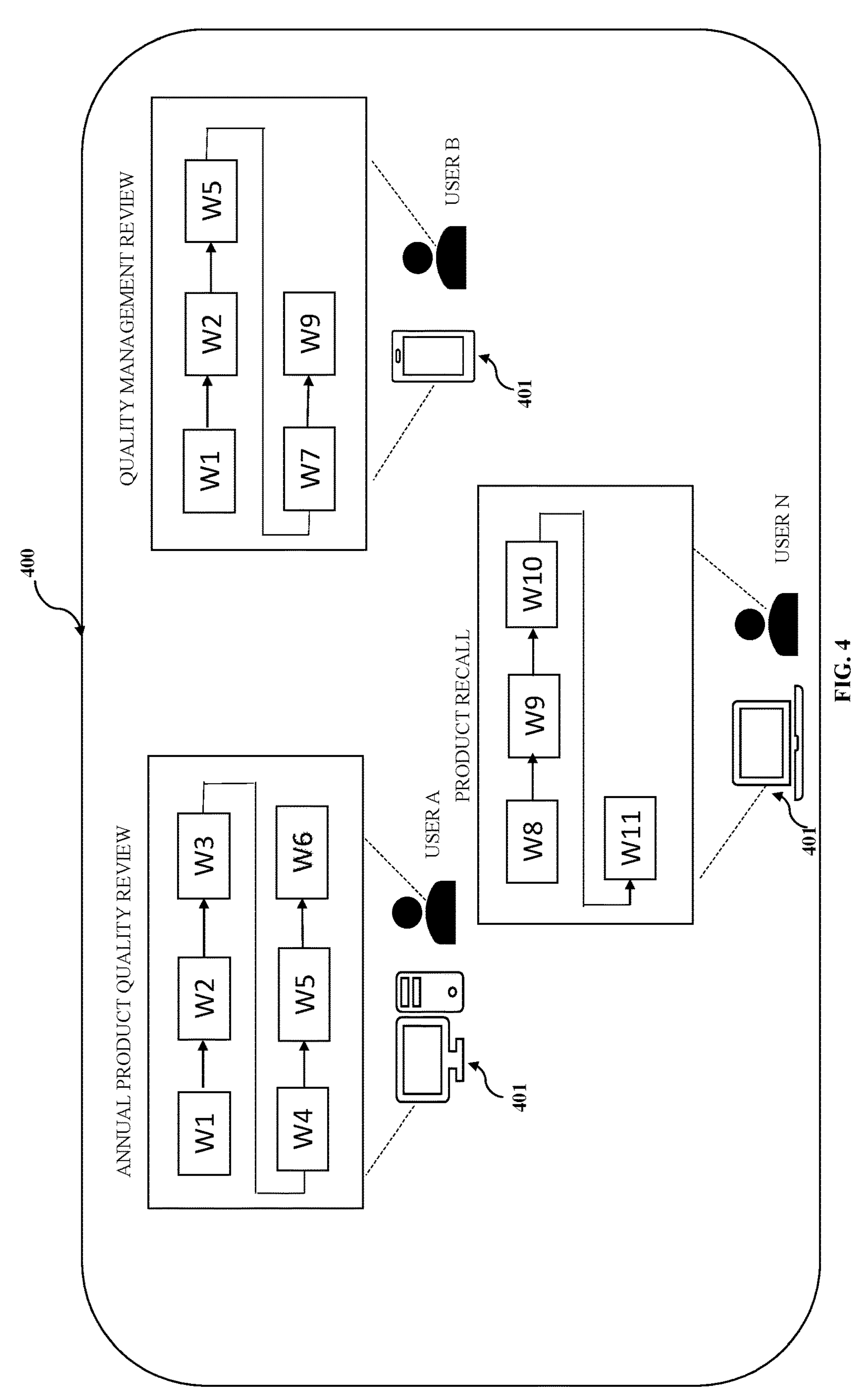
Figure 5:
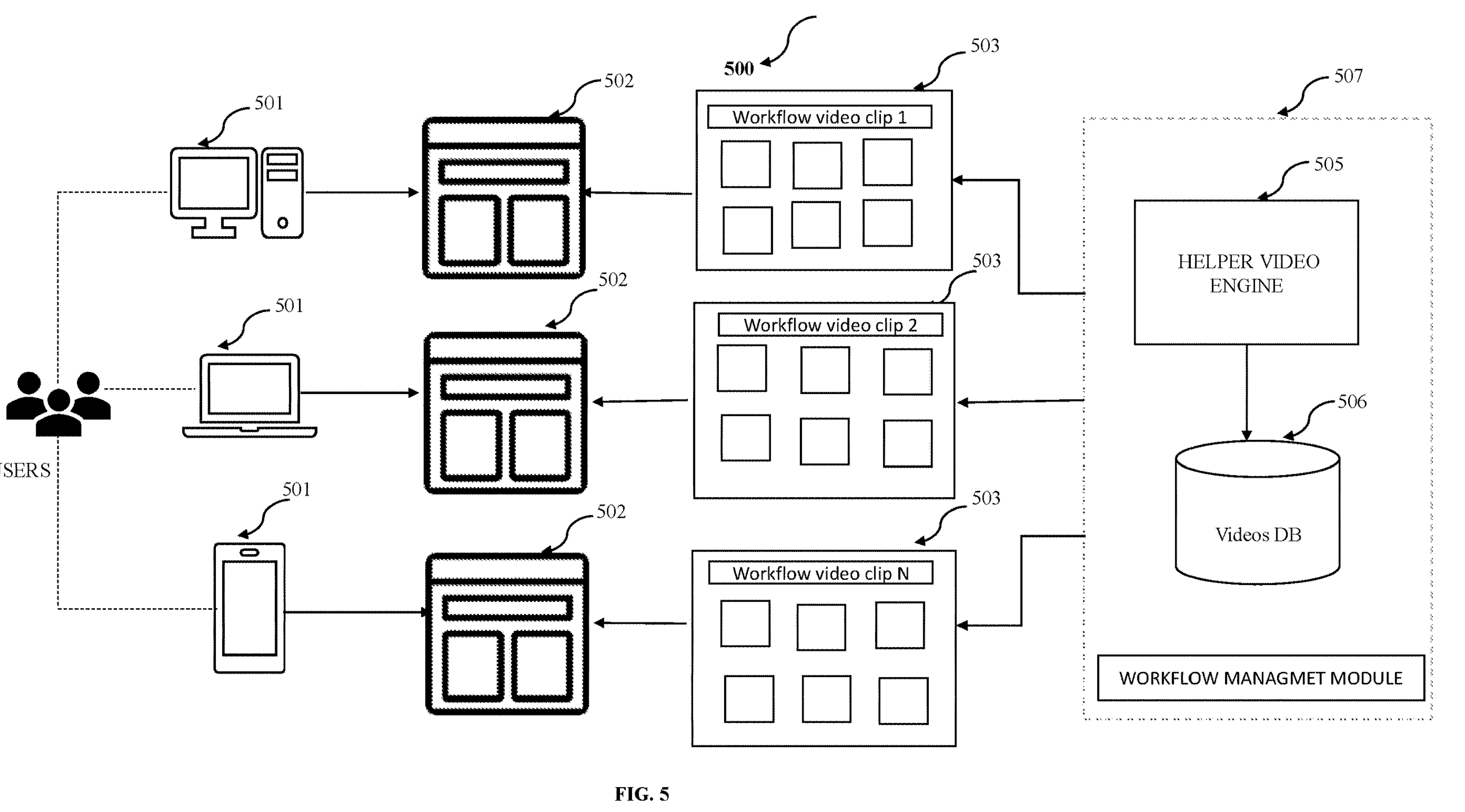
Figure 6:
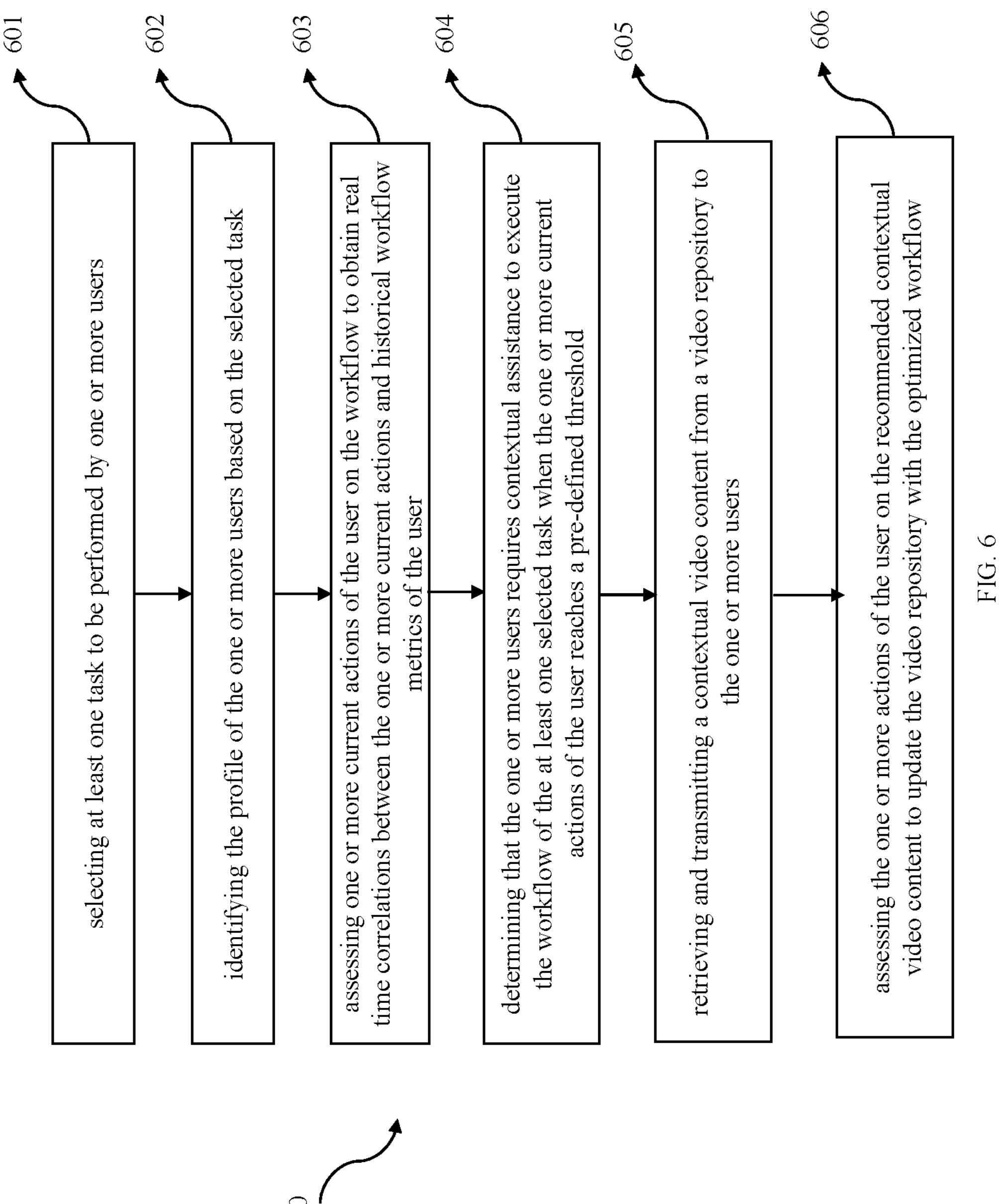

Having thus described the embodiments of the disclosure in general terms, reference now will be made to the accompanying drawings, which are not necessarily drawn to scale, and wherein:

FIG. 1 illustrates an exemplary block diagram of an environment, in which embodiments of the present disclosure may operate;

FIG. 2 illustrates an exemplary block diagram of a system for optimizing workflows of tasks in accordance with one or more embodiments described herein;

FIG. 3 illustrates another exemplary block diagram of a system for optimizing workflows of tasks in accordance with one or more embodiments described herein;

FIG. 4 is an exemplary block diagram of an enterprise setting in accordance with one or more embodiments described herein;

FIG. 5 illustrates a block diagram of an example system for embedding contextual video clips for workflow optimization in accordance with one or more embodiments described herein;

FIG. 6 illustrates a flow diagram of a method for optimizing workflows of tasks in accordance with one or more embodiments described herein;

DETAILED DESCRIPTION

Some embodiments of the present disclosure now will be described more fully hereinafter with reference to the accompanying drawings, in which some, but not all, embodiments of the disclosure are shown. Indeed, embodiments of the disclosure may be embodied in many different forms and should not be construed as limited to the embodiments set forth herein, rather, these embodiments are provided so that this disclosure will satisfy applicable legal requirements. Like numbers refer to like elements throughout.

As used herein, the term “comprising” means including but not limited to and should be interpreted in the manner it is typically used in the patent context. Use of broader terms such as comprises, includes, and having should be understood to provide support for narrower terms such as consisting of, consisting essentially of, and comprised substantially of.

The phrases “in one embodiment,” “according to one embodiment,” “in some embodiments,” and the like generally mean that the particular feature, structure, or characteristic following the phrase may be included in at least one embodiment of the present disclosure, and may be included in more than one embodiment of the present disclosure (importantly, such phrases do not necessarily refer to the same embodiment).

The word “example” or “exemplary” is used herein to mean “serving as an example, instance, or illustration.” Any implementation described herein as “exemplary” is not necessarily to be construed as preferred or advantageous over other implementations.

Typically, a business enterprise implements various business processes for collecting and managing the data and information required for that particular enterprise. A series of tasks or business processes may be performed by the organization or enterprise to achieve a business goal or outcome. The various internal processes can include designing, monitoring and controlling product design processes, production processes, manufacturing processes, sales processes and the like. Such business processes or tasks may typically involve a series of workflows to complete the particular task. Each workflow may be a sequence of steps or actions that happen between the beginning and end of any task and carried out in a specific order by users of the enterprise to complete the task. For example, a large enterprise may have thousands of users (e.g. employees) who may perform various tasks related to business operations.

One or more enterprises may be involved in manufacturing and distribution of one or more products and the products may include but not limited to healthcare related products including medical devices, medicines, therapeutic compositions. Tasks in a manufacturing unit of an enterprise may, for example include annual product quality review, quality management review, recalling of faulty products, quality control issues, supply chain problems, regulatory compliance, knowledge management review, design control etc. Other examples may include but not limited to intelligent audit planning, emergency response systems, among others. In the case of a workflow for intelligent audit planning, the attributes may be documents, signature forms, processes, and regulatory procedures. In the case of a workflow for manufacturing, the attributes may be delivery of products, product recall, failure of product meeting inventory among others. The workflows for these tasks require various users with different roles performing specific tasks like configuration, data analysis, project management, administrative tasks, approvals, executive responsibilities, etc.

The complexity of the workflows for completing one or more tasks may vary based upon the type of industry, size of the enterprise, and/or products or services that the industry caters to. Generally, large amounts of data regarding aspects of a workflow are utilized by enterprises to identify the complexity of the workflow. Workflows may be a series of repetitive steps that occur in a particular order. In one instance, workflow may define steps or actions associated with performing a task, such as producing an item or delivering an item, and may identify the employees that may perform these tasks. In another instance, some complex workflow steps may include configuration of data sources, object models, chart configurations, table configurations, calculation configurations and the like. Therefore, managing such complex workflows becomes crucial and may be implemented by tracking and monitoring the tasks performed by users of an enterprise and thereby streamlining the coordination of business processes within the enterprise. Feedback obtained from users or customers may also be used in identifying, designing, executing and optimizing the complex workflows.

Typically, to manage the ecosystem for a business enterprise, data is collected and aggregated from diverse business applications. As large amounts of data may be received from different enterprises, workflow metrics for managing the business processes may vary and become complex based on the business requirements of the particular industry. For example, workflows may need to be modified to accommodate different tasks, either in response to a previous iteration of the workflow or in response to a new requirement of a workflow. Thus, workflows may need to be streamlined based on the differing business requirements of the enterprise.

Accordingly, analyzing and optimizing one or more aspects of a workflow including results from users' completion of tasks is important so that the workflows are performed efficiently and successfully. For example, workflows of processes can be customized, adjusted or fine-tuned by altering the workflows or streamlining everyday repeatable tasks, reducing the likelihood of errors in execution of tasks, avoiding redundant tasks and delays in execution of tasks. This not only reduces costs and resources but increases efficiency in managing business operations and improves business goals.

Therefore, there is a need to provide an efficient workflow management system and framework that is flexible and is adaptable to evolving business requirements, making it easy for the users to navigate through the internal business processes within an enterprise.

There is also need to provide a workflow management system for precise execution of workflows that minimizes errors, prioritizes workflows, reduces costs, optimizes resources, reduces time spent on repetitive tasks, thereby enabling improved decision making by the enterprises.

There is yet a need to provide an efficient system for workflow optimization that enables businesses to simplify the complex configuration/workflow phases of task or business processes and enhances the overall user experience. The optimized workflow for the tasks may also be analyzed to gain insights into workflow performance and business intelligence.

Accordingly, the present disclosure provides a method and system for managing workflows of tasks or business process in an enterprise. Particularly, the present disclosure provides a method and system for optimizing workflows of tasks in an enterprise by embedding intelligent contextual helper video content to a user while performing one or more tasks and thereby enhancing overall user experience.

FIG. 1 illustrates an exemplary block diagram of an environment 100, in which the embodiments of the present disclosure may operate. Specifically, FIG. 1 illustrates a plurality of user or client devices 101. In an embodiment, the plurality of client devices 101 may be in operative communication with a workflow management server 102 over a network 103. In one or more embodiments, the one or more client devices 101 is integrated within or corresponds to a mobile computing device, a smartphone, a tablet computer, a mobile computer, a desktop computer, a laptop computer, a workstation computer, a wearable device, a virtual reality device, an augmented reality device, or another type of remote computing device. Although exemplary system 100 is shown with three client devices 101, any number of client devices may be supported.

In an embodiment, the plurality of client devices 101 may be operable by one or more users of an enterprise to manage the workflow of one or more tasks associated with a business operation typically to achieve a particular business goal or objective. For example, a large enterprise may have thousands of users (e.g. employees) who may perform various tasks related to business operations. One or enterprises may be involved in manufacturing and distribution of one or products and the products may include healthcare related products including medical devices, medicines, therapeutic compositions. Tasks in a manufacturing unit of an enterprise may, for example may include but not limited to annual product quality review, quality management review, recalling of faulty products, quality control issues, supply chain problems, regulatory compliance, etc. Each workflow may be a sequence of steps or actions that happen between the beginning and end of any task and carried out in a specific order by users of the enterprise to complete the task. The workflows for these tasks require various users with different roles performing specific tasks like configuration, data analysis, project management, administrative tasks, approvals, executive responsibilities, etc.

According to various embodiments, a network 103 is configured to provide communication between various components depicted in FIG. 1. In some embodiments, the network 103 includes a public network (e.g., the Internet), (e.g., an internal localized, or closed-off network between particular devices). In some other embodiments, the network 103 may be a hybrid network (e.g., a network enabling internal communications between particular connected devices and external communications with other devices). Such configuration(s) include, without limitation, a wired or wireless Personal Area Network (PAN), a Cloud network, Local Area Network (LAN), Metropolitan Area Network (MAN), Wide Area Network (WAN), and/or the like. In various embodiments, the network 103 may include one or more base station(s), relay(s), router(s), switch(es), routing station(s), and/or the like.

In an embodiment, the plurality of client devices 101 may be utilized by the employees or users of an enterprise to connect to the workflow management server 102 via a secure communication channel over the network 103. In an embodiment, the workflow management server 102 may require that authentication credentials are provided by the one or more client devices 101. In some embodiments, the authentication credentials may include a username, password, and the like. Once the user is authenticated, the one or more users of the enterprise may connect to the workflow management server 102 using the one or more client devices 101. In am embodiment, the workflow management server 102 may be responsible for managing the workflows of various tasks executed by the users of the enterprise.

The workflow management server 102 and the one or more client devices 101 are is described in greater detail in FIG. 2.

FIG. 2 is an exemplary block diagram illustrating a system 200 for optimizing the workflows of tasks in accordance with one or more embodiments described herein. In an embodiment, the system 200 may comprise a workflow management server 207 (103 of FIG. 1) for managing the workflows of various tasks executed by the employees of the organization to complete a business process. In an embodiment, the workflow management server 207 may typically comprise a processor 209 communicably coupled to a memory 210. The processor 209 may store and execute instructions for implementing the functions of the workflow management server 207. In an embodiment, the workflow management server 207 may communicate via a communication interface with one or more client devices 201 over the network 206.

In an embodiment, the workflow management server 207 may include a memory 210 operatively to the processor 209. The memory 210 may be non-transitory and may include, for example, one or more volatile and/or non-volatile memories. In some embodiments, the memory 210 includes or embodies an electronic storage device (e.g., a computer readable storage medium). In some embodiments, the memory 210 is configured to store information, data, content, applications, instructions, or the like, for enabling a system to carry out various operations and/or functions in accordance with example embodiments of the present disclosure.

In one or more embodiments, the system 200 may include one or more software modules or components for workflow optimization in accordance with the one or more embodiments of the present disclosure. In an embodiment, the one or more software modules may include but not limited to the workflow management module 208 which implements the functions of the workflow management server 207 through the processor 209. In one or more embodiments, the workflow management module 208 may enable the users of the enterprise to complete one or more tasks associated with the operations of the business. In an embodiment, the workflow management server 207 may comprise a data repository 211 containing data to be monitored, manipulated and used by the workflow management module 208 for workflow optimization. In some embodiments, the data repository 211 may comprise one or more databases storing data and information necessary for workflow optimization. In an embodiment, the data stored in the data repository 211 may be historical data associated with users, enterprises, products, video and audio content, workflow metrics associated with various tasks or business processes. In an embodiment, the data stored in one or more databases may be real time data or near real time data related to business processes. In one embodiment, the one or more databases may be cloud-based database. In another embodiment, the one or more databases may be a localized database.

In an embodiment, the one or more client devices 201 may also include a memory 204 operatively coupled to the processor 203. In an embodiment, the users of the enterprise may utilize the workflow management application(s) 202 of the client devices 201 for executing one or more tasks associated with the business operations. The workflow management application(s) 202 enable the users to connect to the workflow management server 207 through a network 206 by providing authentication credentials through the user interface 205 of the or more client devices 201. Once the user is authenticated, the one or more users of the enterprise may connect to the workflow management server 207 using the one or more client devices 101. In an embodiment, the workflow management server 103 may be responsible for managing the workflows of various tasks executed by the users of the enterprise. The workflows for these tasks require various users with different roles performing specific tasks like configuration, data analysis, project management, administrative tasks, approvals, executive responsibilities, etc.

In one preferred embodiment, the workflow optimization system 100, 200 of the present disclosure may be configured as a cloud-based system. In various embodiments, the workflow management server 207 may be configured to run one or more services or software applications provided by one or more components of the system 200. In some embodiments, the services may be offered as web-based or cloud-based services to the users of the client devices 201. In one implementation, the one or more components of the system may be implemented on the workflow management server 207. In another implementation, one or more of the components of system 200 and/or the services provided by the components may also be implemented by one or more client devices 201. Users operating the client devices 201 may utilize one or more client applications to use the services provided by the components of the system 200.

In an embodiment, one or more modules (not shown) of the system 100, 200 may be implemented using electronic hardware, computer software, or any combination thereof. Whether such elements are implemented as hardware or software depends upon the application and design constraints imposed on the overall system. Examples of the systems may include computing systems (e.g., servers, datacenters, desktop computers, Internet of Things devices, etc.) and mobile computing systems (e.g., laptops, cell phones, etc.). Although components are described with respect to functional limitations, it should be understood that the particular implementations necessarily include the use of particular computing hardware. It should also be understood that in some embodiments certain of the components described herein include similar or common hardware.

The functions of the workflow management module 208 and the workflow management server 207 of FIG. 2 are described in greater detail in FIG. 3.

FIG. 3 illustrates an exemplary block diagram of a system 300 for optimizing workflows of tasks in accordance with one or more embodiments described herein. In an embodiment, the system 300 may be configured to optimize the workflows of tasks executed by the users of an enterprise to complete a particular business process or task. For example, the workflows are optimized by embedding intelligent contextual video content to help the user complete the workflows associated with the task. In an embodiment, the employees of the enterprise may execute multiple tasks at different points in time to complete one or more business processes associated with business operations. In an embodiment, the plurality of client devices 301 may be utilized by the employees or users of an enterprise to connect to the workflow management server 305 via a secure communication channel over the network 103, 206 (FIGS. 1, 2) to initiate execution of a task. In one or more embodiments, the workflow management module 309 may implement the functions of the workflow management server 305.

In one implementation, the users may execute one or more tasks through the workflow management application(s) 202 (FIG. 2) of the one or more client devices 301 by providing authentication credentials. Tasks in a manufacturing unit of an enterprise may, for example include but not limited to annual product quality review, quality management review, recalling of faulty products, quality control issues, supply chain problems, regulatory compliance, etc. The workflows for these tasks require various users with different roles performing specific tasks like configuration, data analysis, project management, administrative tasks, approvals, executive responsibilities, etc. The examples of workflows or tasks described above are provided for illustrative purposes only, and it is not intended that the present disclosure be limited to only these examples. The examples are provided merely to identify the type of workflows being analyzed. The present disclosure can also apply to other business applications, e.g. a type of workflows for different tenants.

In one implementation, a user A may initiate an execution of task 1 302 which may be, for example, annual quality review of products manufactured by an enterprise. The task 1 302 may involve a series of complex workflows, workflow 1, workflow 2, workflow 3 . . . workflow N between beginning and ending of task 1 302. In another implementation, a user B may initiate an execution of a task 2 303, which may be, for example, quality control issues. The task 2 303 may also involve a series of complex workflows, workflow 1, workflow 2, workflow 3 . . . workflow N between beginning and ending of task 2 303. In yet another implementation, a user N may initiate an execution, task N 304 which may be, for example, a regulatory compliance procedures. The task N 304 may also involve a series of complex workflows, workflow 1, workflow 2, workflow 3 . . . workflow N between beginning and ending of task N 304. The number and complexity of the workflows may vary based on various factors including but not limited to the type of industry, size of the organization, and/or products or services that the industry caters to. For example, the tasks 1 . . . . N may include complex workflow steps like configurations of data sources, object models, chart configurations, table configurations, calculations configurations etc. which may vary and evolve according to the business requirements of the industry. Examples of industries may include but not limited to Pharma, Life Sciences, Bio Tech, Medical Devices industry.

In an embodiment, when the one or more users operating the client devices 301 utilize the workflow application(s) 202 to complete the workflow associated with one or more tasks, the workflow management module 309 may provide guidance to the users by providing intelligent contextual assistance to users. In one embodiment, the contextual assistance is provided in the form of video content or video clips which help the users navigate through the application and complete the task selected by the user. In an embodiment, the workflow management module 309 may comprise historical data regarding the types of users or employees of the enterprise, the workflow metrics and past usage patterns, data about different enterprises or organizations and/or products/services, chapters, among others.

In one or more embodiments, the historical data about the users, organizations, workflow metrics may be stored in one or more databases 306. In an embodiment, the workflow/user/metrics/organization tracker 307 may track and monitor historical user activity data, the profile of the one or more users or employees, the past workflow metrics and historical data regarding the organization or the enterprise, the types of users who may execute the tasks. For instance, user DB 306 is a database that may comprise data about the various users or employees of the organization. Organization DB 306 may comprise data about the organization or the enterprise that the user is associated with. The workflow metrics tracker DB 306 may track the workflow metrics and user activity on the workflow. In an embodiment, the workflow metrics and patterns may be monitored and such data may be saved to the user's profile in one or more databases for future use by the workflow management server 305.

In an embodiment, the workflow management module 309 may comprise a helper video engine 308. For instance, the helper video engine 308 may comprise video content or video clips for providing intelligent contextual assistance to the users for completing the workflow of one or more selected tasks. In an embodiment, the one or more users may select one or more tasks, 302, 303, 304 to be executed through the one or more client devices 301. In an embodiment, when a user selects a particular task to be executed, the workflow management server 305 may track and monitor the session identifier, the currently logged in user, and the current report configuration. In an embodiment, the workflow management server 305 may identify the profile of the user based on the selected task and the historical data stored in the user DB 306 of the workflow management module 309. In an embodiment, the workflow management module 309 may assess the one or more actions of the users on the workflows when executing the selected task. In an embodiment, each user's information is tracked through predefined and configurable workflow metrics transmitted to the workflow management server 305 and some metrics that already persist in the workflow management server 305.

In an embodiment, the workflow management server 305 may draw real time correlations between the one or more current actions of the user and historical workflow metrics of the user stored in the workflow metrics tracker DB 306. In an embodiment, historical workflow metrics comprises one or more previous actions or preferences of the user for executing the workflow of the at least one selected task. In an embodiment, real time correlations are derived between the currently logged in user, their actions in the particular organization and activities, for example, the number of times a user logged in, the amount of time spent on a particular workflow, the number of clicks that occurred in a current workflow, the number of times previously the particular user accomplished the current workflow, the correlation of their current action on the most expected next action among others derived from prior workflows and out of the box workflows.

In an embodiment, the workflow management module 309 may determine whether the user needs contextual assistance to complete the selected task, when the one or more actions of the user on the workflow reaches a pre-defined threshold. For example, the pre-defined threshold may be an amount of time spent on a particular workflow, the number of clicks that occurred in a current workflow, etc. For example, amount of time spent on a particular workflow may be an average wait time and an average handling time on the workflow.

In an embodiment, when one or more actions of the user reaches a pre-defined threshold, the helper video engine 308 retrieves and transmits static contextual video content from the videos DB 306 to help the user complete the selected task. In an embodiment, the contextual video content are intelligent workflow video clips, 310, 311 transmitted by the helper video engine 308, from the videos DB 306 to the user, giving recommendations regarding the possible next action of the user to complete the workflow of the selected task. In an embodiment, the recommended next action of the user transmitted by the helper video engine 308 may be a workflow video clip, 310, 311 displaying the intended action of the user for completing and optimizing the workflow of the at least one selected task. In an embodiment, the workflow management module 309 may assess the one or more actions of the users on the recommended workflow clips, 310, 311. In one or more embodiments, the workflow management module 309 may update the videos DB 306 based on the current action of the users on the recommended video content to further improvise the workflow performance.

For example, each enterprise's data may include multiple products based on different categories of data and therefore indexing is created for each enterprise's data and its products. For example, each enterprise has a tenant index and further indexes such as product indexes, Department indexes, Chapter Indexes may be created based on enterprise requirements. The tenant index represents attributes representing an enterprise. The product index represents attributes representing one or more characteristics of the product. The Department index represents attributes of the relevant department pertaining to one or more products. The Chapter index may represent attributes relating to operating status such as manufacturing, trial phase, research phase etc.

In one or more embodiments, specific video recommendations may be provided based on the type of user, type of department and chapter. Users may be for example, a fabric admin user, a business admin user or the chapter owner. In one implementation, a fabric admin user logging onto a business application or workflow application 202 for the first time may receive workflow clips 310, 311 for setting up products, data sources, objects and schema relationships. In another implementation, a business admin user may receive specific video clips 310, 311 based on the current configuration of their organization and data sources. For example, if the fabric admin has configured data sources, the business admin may have to do Process Performance Review for their manufacturing process including CPP's (critical process parameters), Critical Quality Controls (CQC's) etc. In some embodiments, specific video clips, 310, 311 may be recommended to department user and approver levels based on prior experience and previous configurations etc. Thus, the workflow management server 305 may provide contextual helper video clips, 310, 311 during complex configuration/workflow phases so simplify and optimize the workflow and enhance the overall user experience.

In an embodiment, the user may choose to accept or decline the workflow video clips 310, 311 that is transmitted by the helper video engine 308 based on his or her preferences. In one or more embodiments, the user's actions on the recommended video clips 310, 311 is assessed to determine its usefulness for providing subsequent workflow assistance to one or more users. For example, the amount of time taken to view workflow video clips 310, 311 and the amount of time taken to move on from the video clip to the next possible action may be tracked to determine the usefulness of a particular clip for next subsequent workflow assistance actions.

In an embodiment, the recommended contextual video clips 310, 311 is served to the user by the helper video engine 308 based on the type of user, workflow metrics of the one or more users, the type of department, the type of products and/or the enterprise. In another embodiment, the recommended contextual video clips 310, 311 are transmitted by the helper video engine, 308 based on the current configuration of the enterprise, data sources, one or more objects and schema relationships. In some embodiments, the workflow video clips 310, 311 may also be auto hidden or auto suggested based on patterns observed over the usage of workflow clips across various workflows, enterprises, users, scenarios. In some other embodiments, workflow video clips 310, 311 may be enhanced based on usage patterns determined by the clips' usage. For example, if it is determined that most users forward to a certain portion of the workflow video clip and stop at a certain portion, the video clip may be auto played at a certain point.

FIG. 4 illustrates an exemplary block diagram of an enterprise setting 400 in accordance with one or more embodiments described herein. Specifically, FIG. 4 illustrates a plurality of user or client devices 401. In an embodiment, the plurality of client devices 401 may be in operative communication with a workflow management server 305 (FIG. 3) over a network 103. In an embodiment, the plurality of client devices 401 may be operable by one or more users, user A, user B . . . user N of an enterprise to manage the workflows of one or more tasks associated with a business operation typically to achieve a particular business goal or objective. Tasks in a manufacturing unit of an enterprise may, for example may include but not limited to annual product quality review, quality management review, recalling of faulty products, quality control issues, supply chain problems, regulatory compliance, etc.

In an embodiment, the user A may select a task or business application to be executed, such as the annual quality review of a particular product through the user interface, 205 (FIG. 2) of the client device 401 to connect to the workflow management server 305 via the network, 206. In an embodiment, the user A may execute a series of workflows W1, W2, W3, W4, W5, W6 in order to complete the quality review process of the product. In a non-limiting example, quality review process may include developing product quality review reports consisting of multiple chapters that are pertinent to the quality review process specific to a particular product. Each department user is required to refer to multiple data tables, graphs and other data visualizations to perform a chapter analysis based on an input query. For example, a manufacturing department user is required to analyze multiple data of the manufacturing activities of a particular drug for completion of the manufacturing chapter content.

In an embodiment, the workflow management module 309 may guide the user A to navigate through the workflows W1, W2, W3, W4, W5, W6 by embedding context-specific video clips relating to quality review process of a particular product. In an embodiment, if the user A has completed workflows W1, W2, W3 and the user's action on W4 has reached a pre-defined threshold, the helper video engine 308 of the workflow management module 309 may retrieve and transmit intelligent static video clips from the videos DB 306 to the user A to help him complete the workflows W4, W5, W6. The pre-defined threshold in a non-limiting example, may be the amount of time spent on W4 by user A while executing the workflows. The specific video clips transmitted to the user A recommends the possible future action for the user to complete the workflows regarding the product quality review. To this end, the workflow/user/metrics/organization tracker 307 may track and monitor historical user activity data, profile of user A, his or her past workflow metrics on this workflow, his or her previous iteration of this workflow, the type or organization or the enterprise, the type of user, the type of products, etc. In an embodiment, real time correlations are drawn between the user A's past historical activity data in completing the workflow, and the user's current actions on the workflow, to render intelligent helper video clips to assist the user A.

In an embodiment, the user B may select a task or business application to be executed, such as the quality management review process of the enterprise by operating the one or more client device 401 to connect to the workflow management server 305 via the network 206. In an embodiment, the user B may execute a series of workflows W1, W2, W5, W7, W9 in order to complete the quality management reviews. In a non-limiting example, quality management review process may include data collection from production process, inspections, audits, customer feedback, product quality, generating KPI reports.

In an embodiment, the workflow management module 309 may guide the user B to navigate through the workflows W1, W2, W5, W7, W9 by embedding context-specific video clips relating to quality management review process. In an embodiment, if user B has completed workflows W1, W2 and the user's action on W5 has reached a pre-defined threshold, the helper video engine 308 of the workflow management module 309 may retrieve and transmit static video clips from the videos DB 306 to the user B to help him complete the workflows W5, W7, W9. The pre-defined threshold in a non-limiting example, may be the number of times the user B has clicked on W5 while executing the workflow. The specific video clips transmitted to the user B recommends the possible future actions for the user to complete the workflows W5, W7, W9 associated with the quality management review. In an embodiment, the workflow/user/metrics/organization tracker 307 track and monitor historical user activity data, profile of user B, his or her past workflow metrics on this workflow, his or her previous iteration of this workflow, the type or organization or the enterprise, the type of user, the type of products, etc. In an embodiment, real time correlations are drawn between the user B's past historical activity data in completing the workflow, and the user's current actions on the workflow, to render intelligent helper video clips to assist the user B.

In an embodiment, user N may select a task or business application to be executed, such as the recall of faulty products by operating one of more of the client device 401 to connect to the workflow management server 305 through the network 206. In an embodiment, the user N may execute a series of workflows W8, W9, W10, W11 in order to complete the product recall process. In an implementation, product recall process may be performed when the products dispatched to the consignees is found faulty after dispatching. The dispatched products can be found to be faulty due to various reasons such as regulatory noncompliance, quality noncompliance, dispensing and packaging issues, product expiration, supply chain problems, etc. Therefore, in order to maintain consumer safety and regulatory compliance, such faulty products are required to be recalled from the consignees. The workflows W8, W9, W10, W11 may be performed by the user in order to complete the workflows related to product recall process.

In an embodiment, the workflow management module 309 may guide the user N navigate through the workflows W8, W9, W10, W11 by embedding context-specific video clips relating to product recall process of a particular product. In an embodiment, if the user N has completed workflows W8, W9 and the action of the user on W10 has reached a pre-defined threshold, the helper video engine 308 of the workflow management module 309 may retrieve and transmit static video clips from the videos DB 306 to the user N to help him complete the workflows W10, W11. The pre-defined threshold in a non-limiting example, may be the number of times previously the particular user accomplished the current workflow. The specific video clips transmitted to the user N recommends the possible future action for the user to complete the workflows regarding the product recall process. To this end, the workflow/user/metrics/organization tracker 307 track and monitor historical user activity data, profile of user N, his or her past workflow metrics on this workflow, his or her previous iteration of this workflow, the type or organization or the enterprise, the type of user, the type of products, etc. In an embodiment, real time correlations are drawn between the user N's past historical activity data in completing the workflow, and the user's current actions on the workflow, to render intelligent helper video clips to assist the user N.

In an embodiment, the video clips may also comprise audio content. In an embodiment, the video clips may be a video stream, recording, and so forth. In an embodiment, the duration of the video clips may vary based on the complexity of the workflow.

In an embodiment, the users or employees A, B . . . N may choose to watch the video clip or decline the video clip that is served through the user interface of the client devices 401. For example, user A may choose to watch a particular portion of the video clip to complete the workflows on the selected task, while user B may decline watching the video clip. In another example, user N may watch certain portions of the video clip and skip certain portions of the video clip. The user's current actions on the recommended video clip is also monitored and tracked to optimize the existing workflow and to determine the usefulness of the video clip for subsequent workflow assistance.

FIG. 5 illustrates a block diagram of an example system for embedding contextual video clips for workflow optimization in accordance with one or more embodiments described herein. Specifically, FIG. 5 illustrates a plurality of user or client devices 501. In an embodiment, the plurality of client devices 501 may be in operative communication with a workflow management server 305 (FIG. 3) over a network 103. In an embodiment, the plurality of client devices 501 may be utilized by the employees or users of an enterprise to connect to the workflow management server 305 via a secure communication channel over the network 103 (FIG. 1). In an embodiment, the workflow management server 305 may require that authentication credentials are provided by the one or more client devices 501. Once the user is authenticated, the one or more users of the enterprise may connect to the workflow management server 305 using the one or more client devices 501. In an embodiment, the workflow management server 501 may be responsible for managing the workflows of various tasks executed by the users of the enterprise.

In an embodiment, the plurality of client devices 501 may be operable by one or more users, user A, user B . . . user N of one or more enterprises to manage the workflows of one or more tasks associated with a business operations. The one or more users may utilize the workflow management application(s) 202 (FIG. 2) to select a particular task to be executed. In a non-limiting example, a particular task such as regulatory compliance procedures of a business unit may be selected by user A. In an embodiment, the workflow management module 507 identifies the profile data of the user by tracking the session identifier, the user account and the user A's workflow metrics. In an embodiment, the workflow management module 507 enables the helper video engine 505 to retrieve and transmit helper video clip 503 from the videos DB 506 to the user A. In an embodiment, the one or more video clips 503 may be viewed by the user on the user interface UI1 502 of the one or more client devices 501. In an embodiment, the context-specific video content 503 displayed on UI1 502 may be a video clip, stream, recording, and so forth. In an embodiment, the video clips may also comprise audio content. In an embodiment, the one or more users can watch the video clips 503 via a browser or an application on the one or more client devices 501. For example, the client device 501 may be a mobile device, a laptop computer, or a desktop computer, tablet, etc.

In an embodiment, the helper video engine 505 may utilize the stored video clips 503 for providing contextual assistance to the one or more users via the user interface UI1, UI2, UI3 502 of the client devices 501. In an embodiment, one or more video clips 503 may be stored in a database videos DB 506 and may be categorized based on the user profile, workflows metrics, departments, chapters, products, enterprises, etc. In an embodiment, video clips 503 may use a format supported by a browser or a screen of one or more client device 501. The formatting may include modifying a size, resolution, bit rate, aspect ratio, etc. of the video content 503. In an embodiment, variants of the video clips 503 may be obtained to fit different screen sizes and formats. In an embodiment, these variants may be stored in the videos DB 306 for subsequent workflow assistance. In an embodiment, the workflow management module 507 may identify the variant of the video clip 503 based on the type of device that the video clip 503 is being transmitted to, by analyzing device identification information of the one or more client devices 501.

FIG. 6 illustrates an exemplary method for optimizing workflow of tasks executed by users in accordance with one or more embodiments described herein. The method, 600 may be implemented by the workflow optimization system as described above in FIGS. 2 and 3. The method 600 is illustrated as logical flow diagram, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. The order in which the operations are described is not intended to be construed as a limitation, and any number of the described operations can be combined in any order and/or in parallel to implement the method.

According to an embodiment, the method 600 may be implemented by one or more processors or modules illustrated and explained through FIGS. 1-4, therefore detailed explanation of the same is omitted here for the sake of brevity.

The method begins at step 601, wherein the method 600 includes selecting one or more tasks to be executed by one or more users of an enterprise or organization through one or more client devices 101, 201, 301. In an embodiment, the plurality of client devices 101, 201, 301 may be operable by one or more users of an enterprise to manage the workflow of one or more tasks, 302, 303, 304 associated with one or more business operations typically to achieve a particular business goal or objective. For example, a large enterprise may have thousands of users (e.g. employees) who may perform various tasks related to business operations. Tasks in a manufacturing unit of an enterprise may, for example may include but not limited to annual product quality review, quality management review, recalling of faulty products, quality control issues, supply chain problems, regulatory compliance, etc. Each workflow may be a sequence of steps or actions that happen between the beginning and end of any task and carried out in a specific order by users of the enterprise to complete the task. The workflows for these tasks require various users with different roles performing specific tasks like configuration, data analysis, project management, administrative tasks, approvals, executive responsibilities, etc.

At 602, the method 600 includes identifying the profile of the one or more users based on the selected task. In an embodiment, the operations at step 602 may be performed by the workflow management server 305. In one or more embodiments, the historical data about the users, organizations, workflow metrics may be stored in one or more databases, 306. In an embodiment, each user's information is tracked through predefined and configurable workflow metrics transmitted to the workflow management server 305 and some metrics that already persist in the workflow management server 305. In an embodiment, the workflow/user/metrics/organization tracker 307 may track and monitor historical data and information regarding the profile of the one or more users or employees, the past workflow metrics and historical user activity data or user profile data, the organization or the enterprise, the types of users who may execute the tasks, departments, chapters, etc.

At 603, the method 600 includes assessing the one or more current actions of the user on the workflow of tasks. In an embodiment, the operations at step 603 may be performed by the workflow management server 305 through the workflow management module 309. In an embodiment, real time correlations between the one or more current actions of the user on the workflow and the historical workflow metrics of the user is obtained. In an embodiment, historical workflow metrics comprises one or more previous actions or preferences of the user for executing the workflow of the at least one selected task. In an embodiment, real time correlations are derived between currently logged in user, their actions in the particular organization and activities, for example, the number of times a user logged in, the amount of time spent on a particular workflow, the number of clicks that occurred in a current workflow, the number of times previously the particular user accomplished the current workflow, the correlation of their current action on the most expected next action among others derived from prior workflows and out of the box workflows.

At 604, the method 600 includes determining that the one or more users requires contextual assistance to execute the workflow of the at least one selected task when the one or more current actions of the user reaches a pre-defined threshold. In an embodiment, the operations at step 604 may be performed by the workflow management module 309. The pre-defined threshold may be an amount of time spent on a particular workflow, the number of clicks that occurred in a current workflow, etc. For example, amount of time spent on a particular workflow may be an average wait time and an average handling time on the workflow.

At 605, the method 600 includes retrieving and transmitting static contextual video content or workflow video clips 310, 311 from a video repository, videos DB 306 to the one or more users. In an embodiment, the operations at step 605 is performed by the helper video engine 308 of the workflow management server 305. In an embodiment, when one or more actions of the user reaches a pre-defined threshold, the helper video engine 308 retrieves and transmits static contextual video content from the videos DB 306 to help the user complete the selected task. In an embodiment, the contextual video content are intelligent workflow video clips 310, 311 transmitted by the helper video engine 308, from the videos DB 306 to the user, giving recommendations regarding the next action of the user to complete the workflow of the selected task. In an embodiment, the recommended next action of the user transmitted by the helper video engine 308 is a workflow video clip, 310, 311 displaying the intended action of the user for completing and optimizing the workflow of the at least one selected task.

In an embodiment, the recommended contextual video clips 310, 311 is transmitted by the helper video engine, 308 based on the type of user, workflow metrics of the one or more users, the type of department, the type of products and/or the enterprise. In another embodiment, the recommended contextual video clips 310, 311 is transmitted by the helper video engine, 308 based on the current configuration of the enterprise, data sources, one or more objects and schema relationships. In an embodiment, the user may choose to accept or decline the workflow video clips 310, 311 that is transmitted by the helper video engine 308 based on his or her preferences.

At 606, the method 600 includes assessing the one or more action of the users on the recommended workflow clips, 310, 311. In an embodiment, the operations at step 606 is performed by the workflow management server 305. In one or more embodiments, the workflow management server 305 may update the videos DB 306 based on the current action of the users on the recommended video content to further improvise the workflow performance. In one or more embodiments, specific video recommendations may be provided based on the type of user, type of department and chapter. Users may be for example, a fabric admin user, a business admin user or the chapter owner. In one implementation, a fabric admin user logging onto a business application or workflow application 202 for the first time may receive workflow clips 310, 311 for setting up products, data sources, objects and schema relationships. In another implementation, a business admin user may receive specific video clips 310, 311 based on the current configuration of their organization and data sources. For example, if a Fabric Admin has configured data sources, more than likely the Business Admin may have to do Process Performance Review for their manufacturing process including CPP's (critical process parameters), Critical Quality Controls (CQC's) etc. In some embodiments, specific video clips 310, 311 may be recommended to department user and approver levels based on prior experience and previous configurations etc. Thus, the workflow management server 305 may provide contextual helper video clips 310, 311 during complex configuration/workflow phases so simplify and optimize the workflow and enhance the overall user experience.

In one or more embodiments, the user's actions on the recommended video clips 310, 311 is assessed to determine its usefulness for providing subsequent workflow assistance to one or more users. For example, the amount of time taken to view workflow video clips 310, 311 and the amount of time taken to move on from the video clip to the next possible action may be tracked to determine the usefulness of a particular clip for next subsequent workflow assistance actions. In some embodiments, the workflow video clips 310, 311 may also be auto hidden or auto suggested based on patterns observed over the usage of workflow clips across various workflows, enterprises, users, scenarios. In some other embodiments, workflow video clips 310, 311 may be enhanced based on usage patterns determined by the clips' usage. For example, if it is determined that most users forward to a certain portion of the workflow video clip and stop at a certain portion, the video clip may be auto played at a certain point.

Embodiments of the present disclosure may thus provide an efficient workflow optimization system and framework that is flexible and is adaptable to evolving business requirements, making it easy for the users to navigate through the internal business processes within an enterprise. The disclosed system and method optimize the workflows by enabling precise execution of workflows that minimizes errors, prioritizes workflows, reduces costs, optimizes resources, reduces time spent on repetitive tasks, thereby enabling improved decision making by the enterprises and enhances the overall user experience. The techniques disclosed herein can help achieve business goals by ensuring that tasks and their dependencies are processed accurately and efficiently. In some embodiments, the workflow optimization system may further help to predict performance against established goals.

The disclosed system and method provide techniques for intelligent assessment of the user intent and workflow metrics of users to suggest optimal solutions to the users for any business process. The techniques not only enhance the operational efficiency of the business process but also enhances user experience and provides insights on workflow performance and business intelligence. Embodiments of the disclosure also ensure that data and workflows are processed consistently according to business requirements and the enterprises' overall efficiency is improved.

The disclosed system and method may also leverage the possibility of using Artificial intelligence (AI) models to understand the users' problem areas in the past and auto select contextual help for guidance. The AI models may also be utilized to collect metrics on contextual help usage patterns to understand where the user interface needs to be altered to be more intuitive.

The figures of the disclosure are provided to illustrate some examples of the invention described. The figures are not to limit the scope of the depicted embodiments or the appended claims. Aspects of the disclosure are described herein with reference to the invention to example embodiments for illustration. It should be understood that specific details, relationships, and method are set forth to provide a full understanding of the example embodiments. One of ordinary skill in the art recognize the example embodiments can be practiced without one or more specific details and/or with other methods.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The phrases "in one embodiment," "according to one embodiment," and/or the like generally mean that the particular feature, structure, or characteristic following the phrase may be included in at least one embodiment of the present disclosure and may be included in more than one embodiment of the present disclosure (importantly, such phrases do not necessarily refer to the same embodiment). The present disclosure intends to include specific reference to all combinations and sub combinations of physically compatible features, components, apparatuses, and processes described herein. As used herein, the term "or" is used in both the alternative and conjunctive sense, unless otherwise indicated. Use of any such aforementioned terms, or similarly interchangeable terms, should not be taken to limit the spirit and scope of embodiments of the present disclosure. As used in the specification and the appended claims. The singular form of "a," "an," and "the" include plural references unless otherwise stated. The terms "includes" and/or "including," when used in the specification, specify the presence of stated features, elements, and/or components, and/or groups thereof.

In an embodiment, the functional units have been labeled as modules, in order to more particularly emphasize their implementation independence. For example, a module may be implemented as a hardware or a software by various types of processors. A module of executable code may, for instance, comprise one or more physical or logical blocks of computer instructions, which may, for instance, be organized as an object, procedure, or function. Nevertheless, the executables of a module need not be physically located together, but may comprise disparate instructions stored in different locations which, when joined logically together, comprise the module and achieve the stated purpose for the module.

In an embodiment, the functional units have been labeled as modules, in order to more particularly emphasize their implementation independence. For example, a module may be implemented as a hardware or a software by various types of processors. A module of executable code may, for instance, comprise one or more physical or logical blocks of computer instructions, which may, for instance, be organized as an object, procedure, or function. Nevertheless, the executables of a module need not be physically located together, but may comprise disparate instructions stored in different locations which, when joined logically together, comprise the module and achieve the stated purpose for the module.

Aspects of the present disclosure may be implemented as computer program products that comprise articles of manufacture. Such computer program products may include one or more software components including, for example, applications, software objects, methods, data structure, and/or the like. In some embodiments, a software component may be stored on one or more non-transitory computer-readable media, which computer program product may comprise the computer-readable media with software component, comprising computer executable instructions, included thereon. The various control and operational systems described herein may incorporate one or more of such computer program products and/or software components for causing the various conveyors and components thereof to operate in accordance with the functionalities described herein.

A software component may be coded in any of a variety of programming languages. An illustrative programming language may be a lower-level programming language such as an assembly language associated with a particular hardware architecture and/or operating system platform/system. Other example of programming languages included, but are not limited to, a macro language, a shell or command language, a job control language, a script language, a database query, or search language, and/or report writing language. In one or more example embodiments, a software component comprising instructions in one of the foregoing examples of programming languages may be executed directly by an operating system or other software component without having to be first transformed into another form. A software component may be stored as a file or other data storage methods. Software components of a similar type or functionally related may be stored together such as, for example, in a particular directory, folder, or repository. Software components may be static (e.g., pre-established, or fixed) or dynamic (e.g., created or modified at the time of execution).

Processor may be embodied in a number of different ways. In various embodiments, the use of the terms "processor" should be understood to include a single core processor, a multi-core processor, multiple processors and/or one or more remote or "cloud" processor(s). In some example embodiments, processor may include one or more processing devices configured to perform independently. In some embodiments, the processor includes hardware, software, firmware, and/or a combination thereof that performs one or more operations described herein.

While this specification contains many specific implementation details, these should not be construed as limitations on the scope of any disclosures or of what may be claimed, but rather as descriptions of features specific to particular embodiments of particular disclosures. Certain features that are described herein in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

In some embodiments, a storage system or other management entity within the artificial intelligence and machine learning infrastructure may also implement automated training with continuous learning based on new data.

It is to be understood that the disclosure is not to be limited to the specific embodiments disclosed, and that modifications and other embodiments are intended to be included within the scope of the appended claims. Although specific terms are employed herein, they are used in a generic and descriptive sense only and not for purposes of limitation, unless described otherwise.

What is claimed:

1. A method for embedding contextual video content for optimizing a user's workflow on a task comprising:

selecting at least one task to be performed by one or more users through a workflow application executed on one or more client devices;

identifying a profile of the one or more users based on the selected task using data stored in a user database;

assessing one or more current actions of the user on the workflow to obtain real time correlations generated by the workflow application between the one or more current actions and historical workflow metrics of the user, wherein the historical workflow metrics comprises one or more previous actions or preferences of the user for executing the workflow of the at least one selected task, wherein the workflow comprises a sequence of workflow steps within the workflow application and the one or more current actions comprise interaction events performed by the user during execution of a current workflow step of the sequence of workflow steps;

determining by a workflow management server, that the one or more users requires real-time contextual assistance to execute the workflow of the at least one selected task when the one or more current actions of the user reaches a pre-defined threshold, wherein the pre-defined threshold is based at least on amount of time spent during execution of the current workflow step and number of clicks occurring during execution of the current workflow step;

retrieving and transmitting a contextual video content from a video repository to the one or more users, wherein the video repository is communicatively coupled to the workflow management server, wherein the contextual video content comprises of a workflow video clip corresponding to the current workflow step and is automatically rendered as a recommended next action of the user, and wherein the recommended next action of the user is an intended action of the user for completing the workflow of the at least one selected task;

assessing by the workflow management server, the one or more actions of the user on the recommended contextual video content to update the video repository with the optimized workflow.

2. The method of claim 1, comprising transmitting the recommended contextual video content based on the type of user, workflow metrics of the one or more users, the type of department, the type of products and/or the enterprise.

3. The method of claim 1, comprising transmitting the recommended contextual video content based on the current configuration of the enterprise, data sources, one or more objects and schema relationships.

4. The method of claim 1, comprising updating the video repository with the optimized workflow for providing subsequent workflow assistance to the one or more users.

5. The method of claim 1, comprising assessing the one or more actions of the user by monitoring the user account and session identifier of the user.

6. The method of claim 1, wherein the recommended contextual video content is accepted or declined by the one or more users.

7. The method of claim 1, wherein the pre-defined threshold comprises one or more actions of the user including the number of times the user has logged for completing the workflow of the at least one selected task.

8. The method of claim 1, comprising providing automated contextual video content based on the usage pattern of the video content and based on the type of users, products, workflows and/or enterprise.

9. The method of claim 1, comprising enhancing the recommended contextual video content based on the usage pattern of the video content by the one or more users.

10. The method of claim 1, comprising storing the enhanced contextual video content in the video repository for providing subsequent workflow assistance to the one or more users.

11. A system for embedding contextual video content for optimizing a user's workflow on a task, comprising:

a processor;

a memory storing program instructions which, when executed by the processor, causes the processor to:

select at least one task to be performed by one or more users through a workflow application executed on one or more client devices;

identify a profile of the one or more users based on the selected task using data stored in a user database;

assess one or more current actions of the user on the workflow to obtain real time correlations generated by the workflow application between the one or more current actions and historical workflow metrics of the user, wherein the historical workflow metrics comprises one or more previous actions or preferences of the user for executing the workflow of the at least one selected task, wherein the workflow comprises a sequence of workflow steps within the workflow application and the one or more current actions comprise interaction events performed by the user during execution of a current workflow step of the sequence of workflow steps;

determine by a workflow management server, that the one or more users requires real-time contextual assistance to execute the workflow of the at least one selected task when the one or more current actions of the user reaches a pre-defined threshold, wherein the pre-defined threshold is based at least on amount of time spent during execution of the current workflow step and number of clicks occurring during execution of the current workflow step;

retrieve and transmit a contextual video content from a video repository to the one or more users, wherein the video repository is communicatively coupled to the workflow management server, wherein the contextual video content comprises of a workflow video clip corresponding to the current workflow step and is automatically rendered as a recommended next action of the user, and wherein the recommended next action of the user is an intended action of the user for completing the workflow of the at least one selected task;

assess by the workflow management server, the one or more actions of the user on the recommended contextual video content to update the video repository with the optimized workflow.

12. The system of claim 11, wherein the processor is configured to provide the recommended contextual video content based on the type of user, workflow metrics of the one or more users, the type of products, the type of department and/or the enterprise.

13. The system of claim 11, wherein the processor is configured to provide the recommended contextual video content based on the current configuration of the organization, data sources, one or more objects and schema relationships.

14. The system of claim 11, wherein the processor is configured to update the video repository with the optimized workflow for providing subsequent workflow assistance to the one or more users.

15. The system of claim 11, wherein the processor is configured to assess the one or more actions of the user by monitoring the user account and session identifier of the user.

16. The system of claim 11, wherein the recommended contextual video content is accepted or declined by the one or more users.

17. The system of claim 11, wherein the pre-defined threshold comprises one or more actions of the user including the number of times the user has logged for completing the workflow of the at least one selected task.

18. The system of claim 11, wherein the processor is configured to provide automated contextual video content based on the usage pattern of the video content and based on the type of users, workflows and/or enterprise.

19. The system of claim 11, wherein the contextual video content is enhanced based on the usage pattern of the video content by the user.

20. A non-transitory computer-readable storage medium, storing program instructions for embedding contextual video content for optimizing a user's workflow on a task, the instructions, when executed, perform the steps of:

selecting at least one task to be executed by one or more users through a workflow application executed on one or more client devices;

identifying a profile of the one or more users based on the selected task using data stored in a user database;

assessing one or more current actions of the user on the workflow to obtain real time correlations generated by the workflow application between the one or more current actions and historical workflow metrics of the user, wherein the historical workflow metrics comprises one or more previous actions or preferences of the user for executing the workflow of the at least one selected task, wherein the workflow comprises a sequence of workflow steps within the workflow application and the one or more current actions comprise interaction events performed by the user during execution of a current workflow step of the sequence of workflow steps;

determining by a workflow management server, that the one or more users requires real-time contextual assistance to execute the workflow of the at least one selected task when the one or more current actions of the user reaches a pre-defined threshold, wherein the pre-defined threshold is based at least on amount of time spent during execution of the current workflow step and number of clicks occurring during execution of the current workflow step;

retrieving and transmitting a contextual video content from a video repository to the one or more users, wherein the video repository is communicatively coupled to the workflow management server, wherein the contextual video content comprises of a workflow video clip corresponding to the current workflow step and is automatically rendered as a recommended next action of the user, and wherein the recommended next action of the user is an intended action of the user for completing the workflow of the at least one selected task;

assessing by the workflow management server, the one or more actions of the user on the recommended contextual video content to update the video repository with the optimized workflow.

* * * * *